United States Patent [19]

Thomey

[11] Patent Number: 4,557,707
[45] Date of Patent: Dec. 10, 1985

[54] BELT TENSIONER

[75] Inventor: Henry W. Thomey, Windsor, Canada

[73] Assignee: Dyneer Corporation, Westport, Conn.

[21] Appl. No.: 598,043

[22] Filed: Apr. 9, 1984

[51] Int. Cl.⁴ .............................................. F16H 7/08
[52] U.S. Cl. .................................... 474/101; 474/135
[58] Field of Search ............... 474/101, 111, 115, 117, 474/133, 135; 74/497

[56]  References Cited
U.S. PATENT DOCUMENTS

| | | | |
|---|---|---|---|
| 1,163,891 | 12/1915 | Caverno | 474/135 |
| 4,069,719 | 1/1978 | Cancilla | 474/135 X |
| 4,270,906 | 6/1981 | Kraft et al. | 474/101 X |
| 4,285,676 | 8/1981 | Kraft | 474/135 |
| 4,362,525 | 12/1982 | Sproul | 474/135 X |
| 4,472,162 | 9/1984 | Hitchcock | 474/135 |
| 4,473,362 | 9/1984 | Thomey et al. | 474/135 |

Primary Examiner—Stephen J. Novosad
Assistant Examiner—Thuy M. Bui
Attorney, Agent, or Firm—Michael Sand Co.

[57] ABSTRACT

A belt tensioning device for an endless drive belt for a vehicle accessories drive system. A bracket is adapted to be mounted on an engine in a stationary position adjacent the drive belt and has lever means pivotally mounted thereon. An idler pulley is rotatably mounted on the lever means and is movable into belt tensioning engagement by a torsional coil spring telescopically mounted about the pivot for the lever means. The pulley is mounted so that a radial center line through the peripheral belt receiving surface of the pulley also passes generally through the center of the lever means pivot to reduce the frictional force exerted on the pivot. A brake band ring is mounted between the bracket and lever means and is biased by the torsional spring into a camming engagement with the lever means to provide a damping force when the lever means attempts to move in either a belt tensioning or non tensioning direction. The damping force is proportional to the belt tensioning force throughout the tensioning range of the belt tensioner since the same coil spring provides both forces. The brake band has angled surfaces which move along complementary angled surfaces formed on the mounting bracket to provide an adjustable camming engagement therebetween.

15 Claims, 21 Drawing Figures

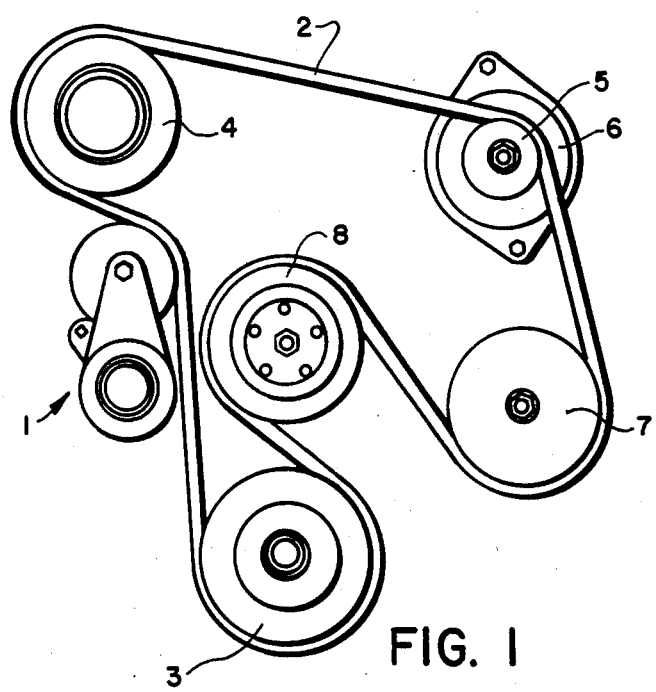
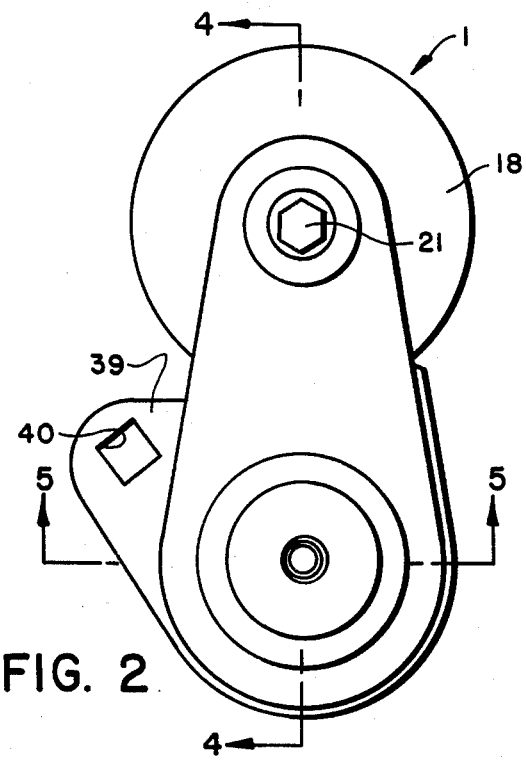
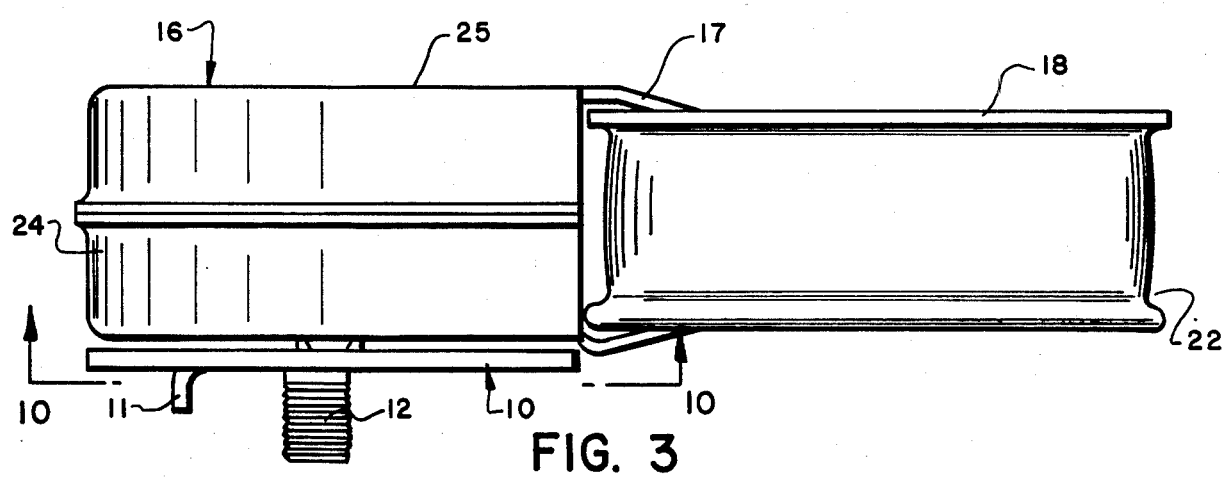
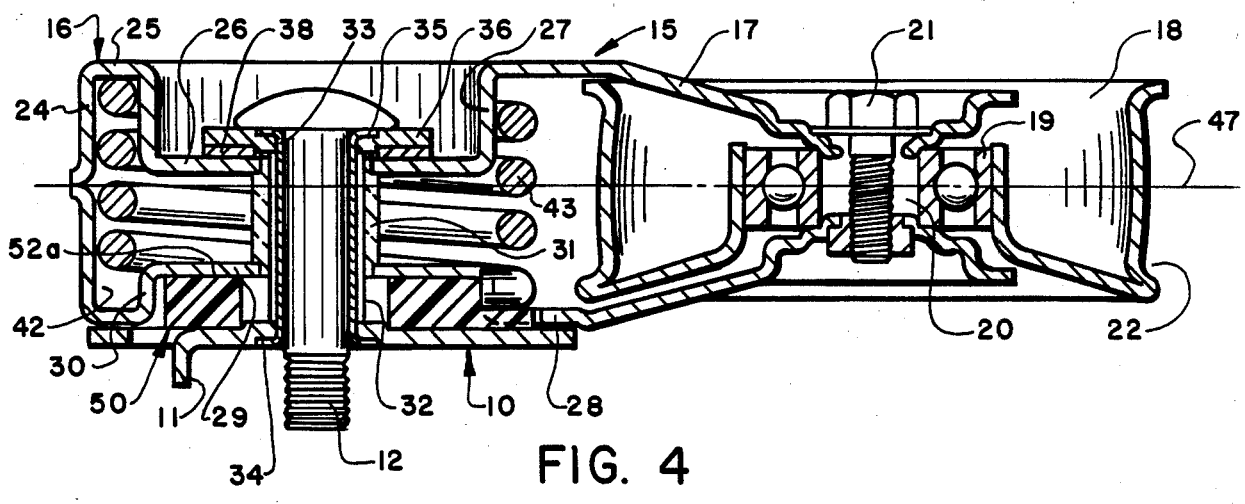

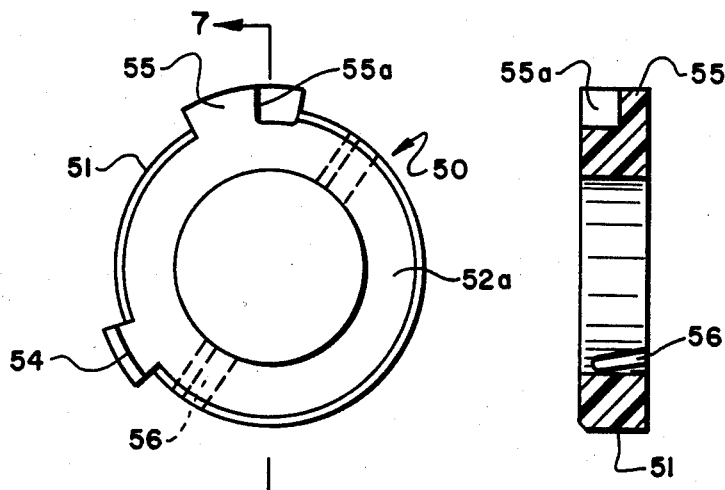
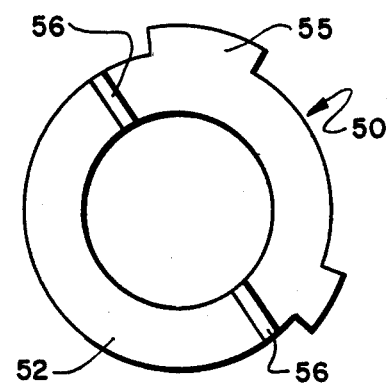
FIG. 6  FIG. 7  FIG. 8
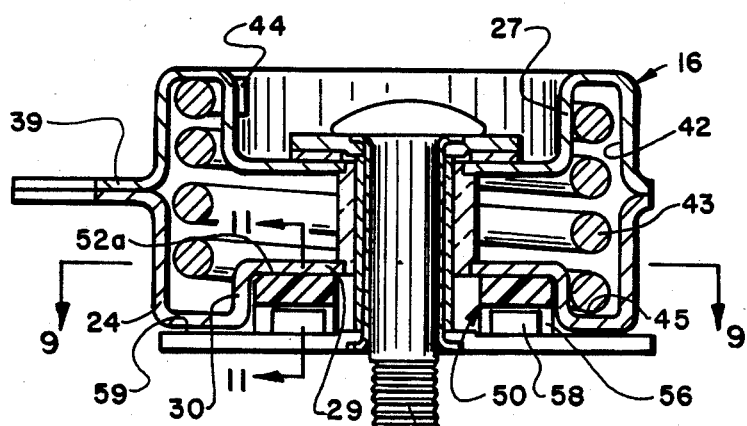
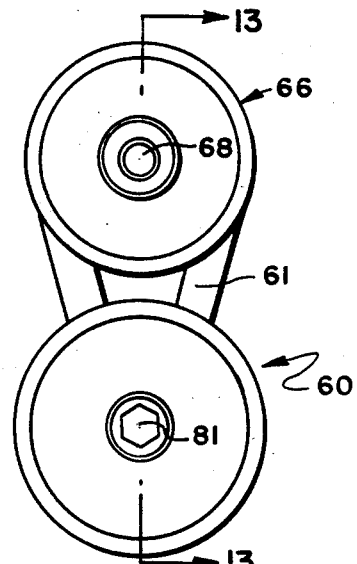
FIG. 5  FIG. 12
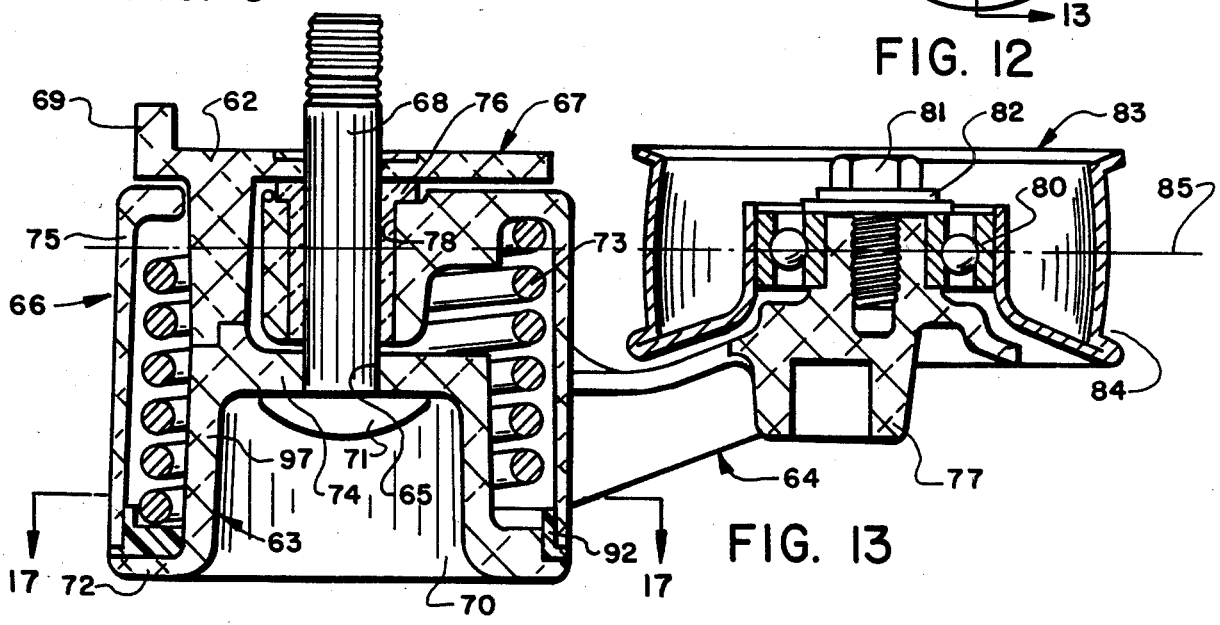
FIG. 13

BELT TENSIONER

TECHNICAL FIELD

The invention relates to belt tensioning devices and in particular to spring biased belt tensioners for use with endless drive belts of the drive systems for vehicle accessories. More particularly, the invention relates to an extremely simple and inexpensive belt tensioner operated by a torsional spring in which the radial centerline of the belt engaging pulley groove is aligned with the pivot bushing of the pulley mounting arm to reduce friction, and in which an improved damping ring reduces undesirable virbration by retarding movement of the pulley mounting arm in both a belt tensioning and non tensioning direction.

BACKGROUND ART

There is a trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioning constructions, which use an elastomeric material, have the disadvantages in that the high load rate which they exert on the belt results in the rapid loss of tensioning as the belt stretches, and this load rate limits the stroke of the belt engaged idler pulley to a shorter distance than desired. Also, sudden acceleration and deceleration of the drive belt can cause a whipping action to occur which creates a time lag before full damping is achieved.

Numerous other types of belt tensioning devices use coil springs which are either in compression or tension, for applying and maintaining the tensioning force on a belt-engaging idler pulley or chain-engaging idler pulley or chain-engaging sprocket. Some examples of these types of constructions are shown in U.S. Pat. Nos. 2,703,019, 2,893,255, 3,413,866, 3,483,763, 3,631,734, 3,768,324, 3,812,733, 3,924,483, 3,965,768 and 4,108,013. Some of these various coil spring-actuated devices use the biasing force of a spring in combination with hydraulic-actuated members for regulating the amount of tensioning force applied to the belt, depending on whether the engine is running or shut off. Examples of these combination spring and hydraulic belt tensioners are shown in U.S. Pat. Nos. 2,051,488, 3,142,193 and 4,077,272.

Other types of tensioning devices and arrangements are provided with some type of mechanical retaining means, usually a ratchet-pawl retaining mechanism, which limits the movement of the belt tensioning member in an opposite nontensioning direction, thereby maintaining a constant tensioning force on the endless drive belt and eliminating the undesirable effects of belt whipping. Examples of these prior constructions and arrangements having such retaining mechanisms are shown in U.S. Pat. Nos. 2,051,488, 2,703,019, 3,413,866, 3,631,734 and 3,812,733.

Other known belt tensioner constructions, such as shown in U.S. Pat. No. 3,924,483, use a torsional spring for pivotally moving one of the vehicle accessories to achieve the desired tensioning force. Other constructions, such as shown in U.S. Pat. Nos. 3,136,170, 3,483,763, 3,834,246 and 4,285,676, use a torsional coil spring for pivotally moving a lever and idler pulley into belt tensioning engagement which provides a relatively simple, economical and compact unit.

It is desirable that a belt tensioner be provided with some type of damping means to prevent excessive oscillation from occurring in the spring tensioning member, and which will absorb sudden shocks to prevent a whipping action from occurring in the tensioner and drive belt. This damping action is especially critical when a coil spring is used for applying the belt tensioning force since coil springs are highly susceptible to developing natural oscillating frequencies when the counter force, which is exerted thereon by the belt, fluctuates during acceleration action affects the efficiency of the tensioning force applied to the belt by the coil spring and reduces belt life.

Various damping devices have been used with belt tensioners to eliminate or reduce this problem of coil spring oscillation. One type of construction uses a hydraulic fluid as the damping means, such as shown in U.S. Pat. Nos. 2,893,255, 3,964,311, 3,986,407 and British Pat. No. 336,737, U.S. Pat No. 3,710,634 shows a belt tensioner which uses an eccentrically mounted mechanical pinion and rack arrangement which is spring biased by a leaf spring for absorbing an excessive amount of shock as opposed to providing a damping action for spring-biased belt tensioning plunger.

It also is highly desirable when developing a belt tensioner intended primarily for use on an automobile to device a construction which can be produced as inexpensively as possible without sacrificing durability and efficiency since a savings of only a part of a dollar would amount to a sufficient overall savings when considering the millions of vehicles that are produced by the various vehicle manufacturers.

Therefore, the need has existed for such a belt tensioner having an improved damping arrangement which, in addition to the features discussed above, provides damping regardless of the position of the idler pulley and its mounting bracket with respect to the stationary engine mounting bracket as the belt stretches, which is not believed to be reliably achieved by any of the prior belt tensioning devices, and which reduces the friction forces exerted on the pivot bushing of the lever means by aligning the belt engaging idler pulley with the bushing centerline.

DISCLOSURE OF THE INVENTION

Objectives of the invention include providing an improved device for tensioning the drive belt for vehicle accessories which maintains a generally constant predetermined tensioning force on the belt throughout the life of the belt regardless of whether the engine is on or off or operating at various speeds and conditions, and regardless of the tensioning position of the belt engaging idler pulley in its tensioning movement range.

Another objective is to provide such a tensioning device which is of a relatively inexpensive design formed of sheet metal components which can be mass produced by simple metal stamping procedures and then assembled with a usual pulley and torsional spring, and in which the radial centerline of the belt engaging idler pulley groove is aligned with the radial centerline of the bushing on which the idler pulley lever mounting arm is pivotally mounted thereby reducing the unbalanced frictional force components heretofore exerted on the pivot bushing increasing the life and operating efficiency of the tensioner.

Still another objective is to provide such a tensioning device having an improved damping mechanism consisting of a split ring of plastic material which is mounted between a fixed engine mounting bracket and a pivotally mounted lever arm, in which the damping ring is moved into frictional engagement with the lever arm by mutually engaged camming surfaces formed on the damping ring and mounting plate to retard undesirable movement of the lever arm in both a belt tensioning and non-tensioning direction; and in which the damping ring is biased into frictional engagement with the lever arm by the same torsional coil spring which provides the tensioning force on the lever arm thereby insuring that the amount of damping is proportional to the torque of the spring which achieves a highly efficient damping action.

Another objective is to provide such an improved belt tensioner in which the frictional force exerted against the lever arm and correspondingly the amount of damping can be adjusted easily by changing the angle of the camming surfaces enabling the amount of damping provided by the tensioner to match the particular characteristics of the vehicle engine on which the tensioner is to be used. A further objective is to provide such an improved tensioner in which the damping ring is biased by the tensioning spring along the camming surfaces into engagement with an arcuate segment of a cylindrical wall portion of the spring housing of the lever arm, and in which a diametrically opposite portion of the spring housing wall is forced into engagement with an opposite portion of the damping ring to provide an equal damping action on the opposite portion of the lever means housing obtaining a balanced damping force thereon.

A further objective is to provide such an improved belt tensioning device which achieves the stated objectives in a simple, effective, rugged and relatively inexpensive manner, and which solves the problems and satisfies need existing in the art.

These objectives and advantages are obtained by the improved belt tensioner construction for automatically tensioning an endless drive belt of a drive system for vehicle engine accessories, the general nature of which may be stated as including: a bracket adapted to be mounted on a vehicle engine adjacent the drive belt; a shaft mounted on the bracket; lever means pivotally mounted on the shaft and extending generally radially outwardly from the shaft for pivotal movement toward and away from the drive belt; pulley means rotatably mounted on an extended end of the lever means and engageable with the drive belt for applying a tensioning force on said belt when the lever is biased in a belt tensioning direction toward the drive belt; coil spring means telescopically mounted about the shaft for biasing the lever means in the belt tensioning direction; and brake band means telescopically mounted about the shaft and cammingly engaged with the lever means for retarding pivotal movement of the lever means in a direction opposite to the belt tensioning direction, with said brake band being biased into engagement with the lever means by the coil spring means.

BRIEF DESCRIPTION OF THE DRAWINGS

Preferred embodiments of the invention, illustrative of the best modes in which applicant has contemplated applying the principles, are set forth in the following description and are shown in the accompanying drawings, and are particularly and distinctly pointed out and set forth in the appended claims.

FIG. 1 is a diagrammatic view looking toward the front of an engine illustrating an endless drive belt operatively connected to and driving the vehicle accessories with the improved belt tensioner engaged with the belt;

FIG. 2 is an enlarged elevational view of the belt tensioner of FIG. 1 removed from engagement with the endless drive belt;

FIG. 3 is an enlarged end elevational view of the improved belt tensioner as shown in FIG. 2;

FIG. 4 is an enlarged longitudinal sectional view taken on line 4—4, FIG. 2;

FIG. 5 is an enlarged sectional view taken on line 5—5, FIG. 2;

FIG. 6 is a top plan view of the brake band of the belt tensioner of FIGS. 1-4;

FIG. 7 is a sectional view taken on line 7—7, FIG. 6;

FIG. 8 is a bottom plan view of the brake band ring of FIGS. 6 and 7;

FIG. 5;

FIG. 12 is an elevational view similar to FIG. 2 showing a modified form of the improved belt tensioner;

FIG. 13 is an enlarged sectional view taken on line 13—13 FIG. 12;

Similar numerals refer to similar parts throughout the drawings.

BEST MODE FOR CARRYING OUT THE INVENTION

Figure 9:
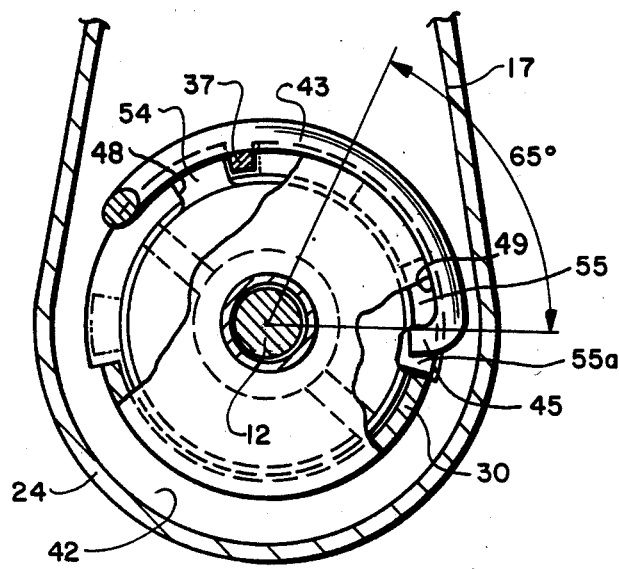
FIG. 9 is a sectional view taken on line 9—9.

Referring to FIG. 1 of the drawings, the improved belt tensioner construction is indicated generally at 1, and is shown in tensioning engagement with an endless drive belt 2 of a power transmission belt drive system which is shown diagrammatically looking toward the front of an engine. The accessory drive system consists of a plurality of belt pulleys or sheaves having configurations and diameters determined by and associated with engine accessory components and their locations relative to each other. The various pulleys are supported on their respective engine components which in turn are mounted on an engine (not shown) in a usual manner known in the art. Belt 2 preferably operates in a single vertical plane to eliminate binding and skewing of the belt.

The particular engine accessories drive system shown in FIG. 1 consists of a main driving pulley 3 which is operatively connected to the main drive shaft of the engine, a pulley 4 which is operatively connected to the engine air pump, a pulley 5 which is operatively connected to an alternator 6 which provides electrical power for the engine, a pulley 7 which is operatively connected to the vehicle power steering unit, and a pulley 8 which is operatively connected to the engine water pump.

Improved belt tensioner 1 (FIGS. 2-5) includes a disc-shaped engine mounting bracket 10 which is formed inexpensively of a one piece stamp sheet metal member. Bracket 10 is formed with an outwardly extending tab 11 which functions as an alignment pin for mounting tensioner 1 on an engine (not shown) by a main mounting bolt 12. Lever means indicated generally at 15, is pivotally mounted on bracket 10. Lever means 15 includes a generally cylindrically shaped spring housing indicated generally at 16, and a pair of radially outwardly extending arms 17. Arms 17 preferably are formed of stamped steel and are integral with spring housing 16. An idler pulley 18 is rotatably mounted on the extended ends of arms 17 (FIG. 4) by a bearing ring 19 which is mounted on a stub shaft 20. Shaft 20 is secured to the extended ends of arms 17 by a mounting block and nut assembly 21. Pulley 18 is shown being formed of stamped steel material having a peripheral belt receiving groove 22. Pulley 18 may have various configurations for receiving a drive belt in an outer belt receiving groove without affecting the concept of the invention.

Housing 16 (FIGS. 3-5) preferably is formed of stamped steel sheet material having a generally cylindrical-shaped sidewall 24 with an annular top wall 25 formed with a central recessed wall 26 connected by an axially extending cylindrical wall 27. Side wall 24 terminates in a bottom wall 28 which has an innder annular-shaped recessed wall 29 connected by an axially extending cylindrical wall 30.

A bronze bushing 31 is attached to the inner ends of walls 26 and 29 forming a bearing mounting hub for housing 16. A hardened tubular sleeve 32 is secured to bushing 31 and has a greater axial length than bushing 31.

Housing 16 is pivotally mounted on mounting bracket 10 by a tubular rivet 33 which is telescopically mounted within tubular sleeve 32. Rivet 33 terminates in an annular bottom flange 34 which secures it to bracket 10 and an annular upper flange 35 which clamps a retaining washer 36 in position on the upper end of tubular sleeve 32. A nylon or plastic washer 38 is clamped between washer 36 and recessed top wall portion 26 of housing 16. A outwardly projecting flange 39 (FIG. 2) may extend from one side of housing wall 24 and is formed with a rectangular shaped hole 40 for receiving an installation bar or similar tool for engaging idler pulley groove 22 with a drive belt 2 after mounting tensioner 1 on the engine.

Housing 16 forms an interior chamber 42 in which a torsional coil spring 43 is located. Spring 43 is a cylindrical shaped helical spring, the convolutions of which are circular in cross section. The spring terminates in a pair of bent spring ends 44 and 45 with end 44 extending through an opening formed in cylindrical wall 27 as shown in FIG. 5 to fix one end of the spring with respect to lever means 15.

In accordance with one of the features of the invention as shown in FIG. 4, the radial center line indicated generally at 47, of pulley groove 22 aligns with or extends approximately through the center line of bushing 31 on which lever means 15 is rotatably mounted. This center line alignment of the idler pulley bearing and the lever means bearing substantially reduces any unbalances force component on bushing 31 which would be exerted by drive belt 2 thereby reducing the amount of friction and increasing the life of tensioner 1.

Figure 11:
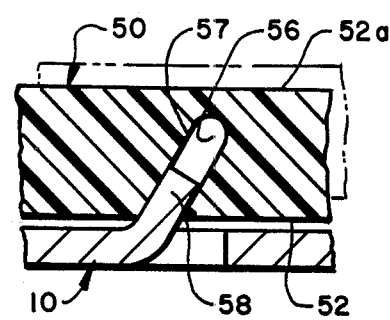
FIG. 11 is an enlarged fragmentary sectional view taken on line 11—11, FIG. 5.
Figure 10:
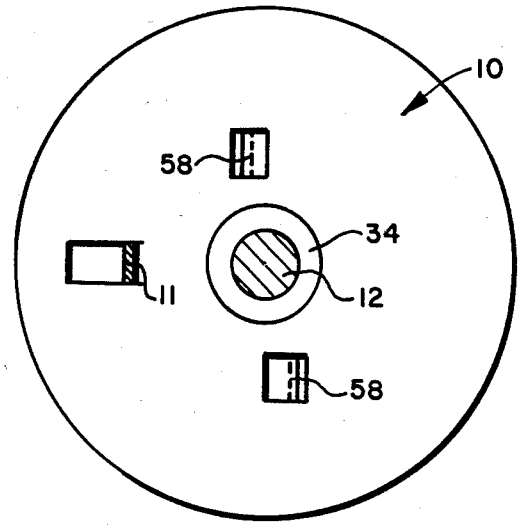
FIG. 10 is a sectional view taken on line 10—10, FIG. 3.

In accordance with another of the main features of the invention, a brake band indicated generally at 50 (FIGS. 6-8) is mounted between mounting bracket 10 and spring housing 16 of lever means 15 to provide a damping effect therebetween. Brake band 50 retards movement of idler pulley 18 and correspondingly of lever means 15 primarily in a non belt tensioning direction which is counter-clock wise in FIGS. 1 and 2, as well as in the opposite belt tensioning direction. Brake band 50 is an annular ring formed of a hard plastic material having a projection 55 formed integrally thereon and extending radially outwardly from cylindrical ring side surface 51. The annular shaped top surface of band 50 is designated as 52a. A pair of recesses 56 are formed in annular ring surface 52 referred to as the bottom surface. Recesses 56 are formed with angled walls 57 as shown in FIG. 11, and are slidably engaged with angled tabs 58 projecting outwardly from top surface 59 of the mounting bracket 10. The angles of inclination of tabs 58 and angled walls 57 are preferably complementary to each other, preferably at an angle of approximately 45°. Preferably two such tabs 58 and angled walls 57 are formed on mounting bracket 10 and brake band 50 located at diametrically opposite locations as shown in FIGS. 7, 8, and 10.

A second projection 54 is formed integrally on brake band 50 and projects radially outwardly from side surface 51 as does projection 55 for engagement with spring 43 as it extends concentrically about and with respect to band 50. Projection 54 is spaced approximately 105° midpoint-to-midpoint from projection 55. Projections 54 and 55 have arcuate lengths of approximately 20° and 30°, respectively.

Brake band 50 is mounted on top surface 59 of mounting bracket 10 with bracket tabs 58 projecting into recesses 56 as shown in FIG. 5. Spring end 45 extends about and is seated in a slot 55a formed in ring projection 55 as shown in FIG. 9 biasing projection 55 and ring 50 in a counter-clock wise direction when viewing FIG. 9. Projections 54 and 55 extend into spring housing chamber 42 through a pair of arcuate openings 48 and 49, respectively, formed in cylindrical wall 30 of housing 16. Openings 48 and 49 each have arcuate lengths of approximately 65° and are separated from each other by a small section 37 of housing wall 30. The biasing force of spring 43 forces angled camming walls or surfaces 57 of ring recesses 56 into engagement with the sloped mating walls of mounting bracket tabs 58 (FIG. 11). This biasing action moves ring 50 in a slightly rotational and axially direction as shown by dot-dash lines in FIG. 11 forcing top surface 52a into frictional engagement with the bottom surface of annular recessed wall 29 of spring housing bottom wall 28 as shown in FIG. 4. This upward force exerted by brake band 50 against housing wall 29 causes top recess wall portion 26 to be pressed against washer 38 to provide increased friction and damping effect. The frictional force component or amount of friction exerted by brake band surface 52a against the lever housing is determined by the torsional force characteristics of spring 43 and the slope of camming tab 58. The steeper the slope of tabs 58 and complementary slope of ring surfaces 57 greater will be the frictional force component exerted perpendicularly against housing surface 29, and correspondingly a smaller angle of inclination of tabs 58 will result in a smaller perpendicular frictional force component exerted against housing wall 29 of lever means 15.

Arcuate openings 48 and 49 in housing wall 30 provide an effective movement of approximately 65° for brake band projections 54 and 55 for the particular embodiment shown in the drawings since the effective tensioning range of tensioner 1 is approximately 60° movement of lever means 15.

In accordance with one of the main advantages achieved by improved belt tensioner 1, torsional spring 43 provides both the belt tensioning force that is exerted on idler pulley 18 through lever means 15 and damping force exerted by brake band 50 against the lever means. This arrangement provides a damping force directly proportional to the belt tensioning force since the same spring is used for both forces. Thus, the damping force is maintained proportional to the tensioning force throughout the tensioning range of tensioner 1 produced by spring 43.

Figure 20:
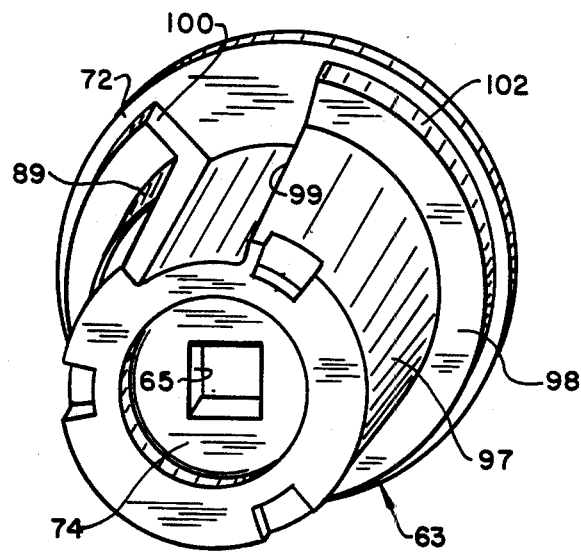
FIG. 20 is a perspective view of the end cap portion of the mounting bracket of the tensioner of FIG. 13.

A modified form of the improved belt tensioner is indicated generally at 60 and is shown particularly in FIGS. 12 and 13. Tensioner 60 includes lever means indicated generally at 64, which is formed by a cylindrical-shaped spring housing 66 and a pair of pivotally extending arms 61. Lever means 64 is pivotally mounted on an engine mounting bracket indicated generally at 67. Bracket 67 includes a base 62 and an end cap 63 and is attached to a vehicle engine by a mounting bolt 68 and positioning pin 69 which is formed on base 62. Mounting end cap 63 has an annular configuration and is formed with a recessed central portion 70 in which head 71 of a mounting bolt 68 is located. Bolt 68 extends throughout an opening 65 formed in a circular wall 74 of end cap 63. End cap 63 terminates in an annular outer flange 72 (FIG. 20).

A torsional coil spring 73 is telescopically mounted about mounting bracket 67 and is located within a cylindrical wall 75 which forms the major portion of spring housing 66. Lever arms 61 extend generally radially outwardly from spring housing 66 and preferably are formed integrally with housing wall 75. Lever arms 61 terminate in a hub shaft 77 on which a bearing ring 80 is mounted by a mounting bolt 81 and a retaining washer 82. An idler pulley 83 is rotatably mounted on bearing ring 80 and is formed with a peripheral belt receiving groove 84 similar to belt groove 22 of idler pulley 18. Lever means 64 is pivotally mounted on bearing ring 80 and is formed with a peripheral belt receiving groove 84 similar to belt groove 22 of idler pulley 18. Lever means 64 is pivotally mounted on mounting bracket 67 by a sleeve bushing 76 which is telescopically mounted on bolt 68 and located within an opening 78 formed in an inner portion of spring housing 66 (FIG. 13).

The mounting relationship of pulley 83 with respect to mounting bracket 67 is similar to that of belt tensioner 1 in that the radial centerline of pulley groove 84 which is indicated at 85 in FIG. 13, extends generally through the center of bushing sleeve 76. Again, this centerline alignment of the pulley groove which usually will be aligned with the pulley bearings, with the centerline of the lever means pivot bushing reduces the unbalanced frictional force heretofore exerted on the lever means mounting bushing thereby extending the life of bushing sleeve 76 and correspondingly of belt tensioner 60.

Figure 15:
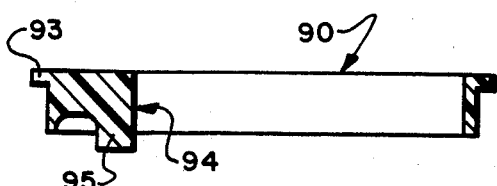
FIG. 15 is a sectional view taken on line 15—15, FIG. 14.
Figure 14:
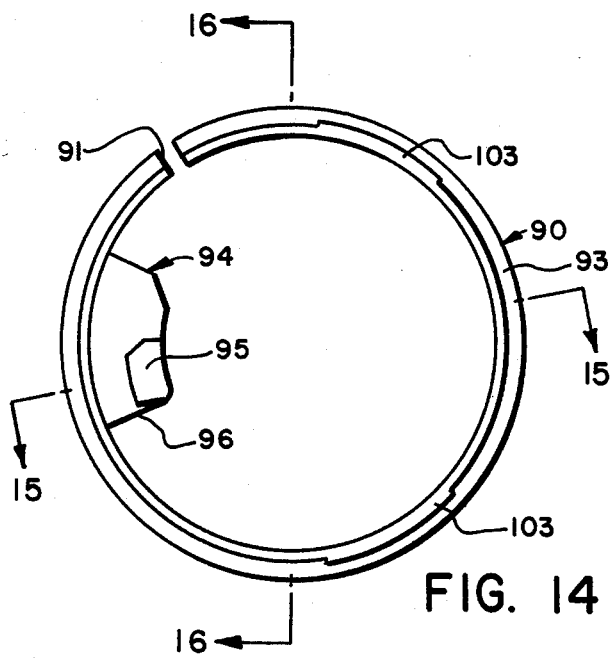
FIG. 14 is a top plan view of the brake band damping ring removed from the belt tensioner of FIG. 13.
Figure 16:
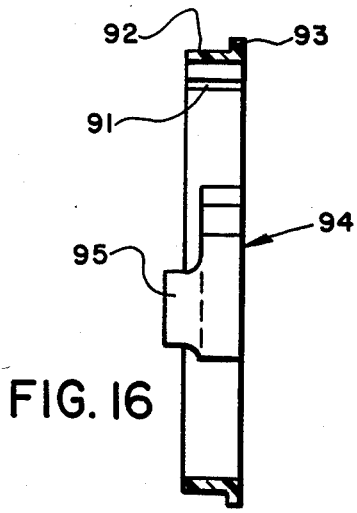
FIG. 16 is a sectional view taken on line 16—16, FIG. 14.

Modified tensioner 60 also includes an improved damping arrangement as does tensioner 1 having a brake band indicated generally at 90, mounted between the stationary mounting bracket and pivotally movable belt tensioning pulley lever. Brake band 90 is shown particularly in FIGS. 14-16 and has an annular configuration formed with a split 91 at one location along its periphery. Brake band 90 has a generally L-shaped cross sectional configuration with a main upstanding leg 92 and a shorter secondary outwardly extending leg 93. A projection indicated generally at 94, is formed integrally with ring leg 92 and extends inwardly toward the center of the ring as shown in FIG. 14. Projection 94 includes a spring retaining lug 95, and in accordance with one of the features of the invention, a camming surface 96. A pair of arcuate shaped projections 103 are formed integrally with upstanding leg 92 and project radially outwardly (FIG. 14) which provide pressure areas for engagement with cylindrical wall 75 of housing 66 when biased thereagainst by spring 73 as described below.

Figure 17:
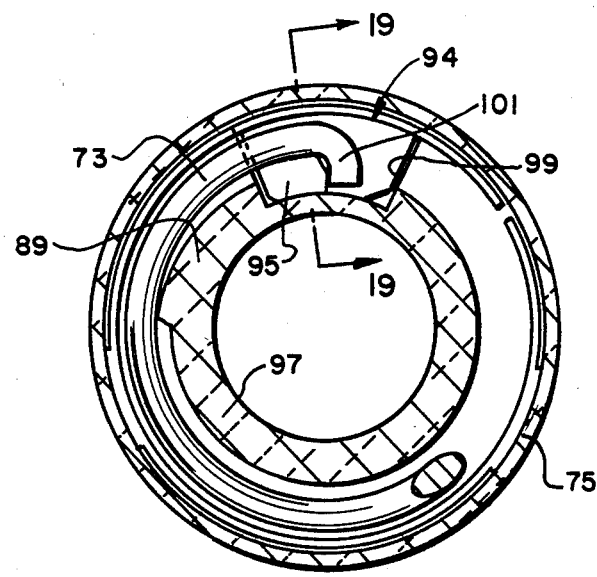
FIG. 17 is a sectional view taken on line 17—17, FIG. 13.
Figure 18:
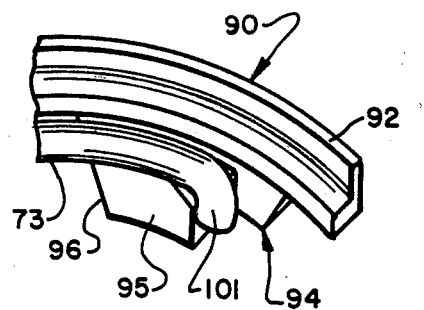
FIG. 18 is an enlarged fragmentary diagrammatic view showing the relationship between the brake band damping ring and spring of the tensioner embodiment shown in FIG. 13.

The operation of brake band 90 in providing the improved damping for modified tensioner 60 is best understood by reference to FIGS. 13 and 17-21. End cap 63 of mounting bracket 67 is shown in FIG. 20 and in addition to outer annular flange 72 includes a cylindrical axially extending wall 97 around which spring 73 is telescopically mounted as shown in FIG. 13. A thickened arcuate strip 89 is formed integrally with wall 97 for primary engagement by spring 73 adjacent bent end 99 (FIGS. 17 and 20). Wall 97 terminates in a lower annular flange 98 which is concentric with and spaced from annular flange 98 as shown in FIG. 20, with edge surface 100 of flange 98 forming a camming surface for engagement with camming surface 96 of brake band projection 54.

Figure 21:
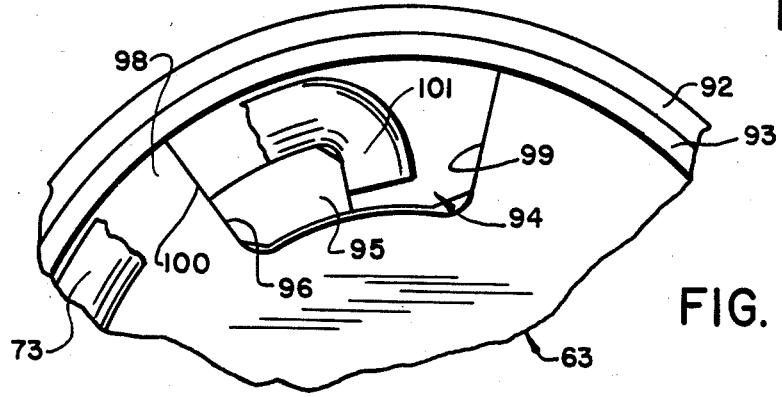
FIG. 21 is an enlarged fragmentary perspective view with portions broken away, showing the relationship between the camming surfaces of the damping ring and end cap portion of the mounting bracket.

When brake band 90 is assembled with end cap 63 and mounting bracket 67, brake band projection 94 will lie within the base of slot 99 as shown in FIG. 21 with camming surface 96 of brake band 90 slidably engaged with camming surface 100 of end cap 63. Spring end 101 of coil spring 73 is bent around spring retaining/lug 95 and biases camming surface 96 into engagement with surface 100 of end cap 63. Upstanding leg 92 of brake band 90 and in particular arcuate shaped pressure projections 103 will lie in abutting engagement with the lower end of cylindrical wall 75 of spring housing 66 as shown in FIG. 13 with the outer surface of secondary brake band leg 93 engaging annular flange 72 of end cap 63.

Figure 19:
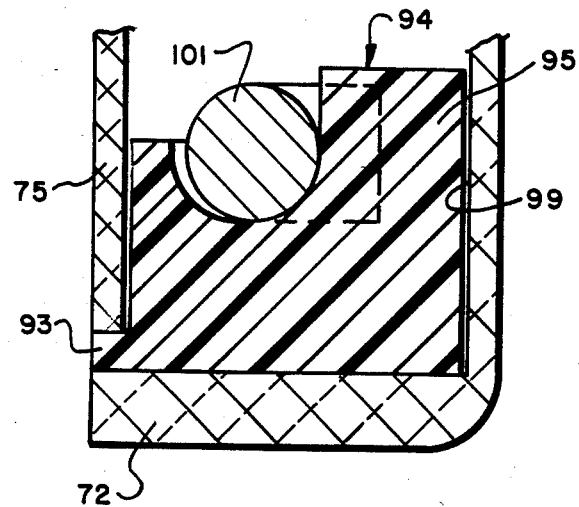
FIG. 19 is a greatly enlarged fragmentary sectional view taken on line 19—19, FIG. 17.

Spring 73 biases brake band 90 including projection 94 in a counter-clock wise direction as shown in FIG. 21 moving projection camming surface 96 upwardly and outwardly along stationary camming surface 100 of end cap 63. This sliding movement of projection 94 will expand brake band 90 in an radially outwardly direction forcing the outer surface of upstanding band leg 92 against the inner surface of pivotally mounted cylindrical wall 75 of the lever means to provide a frictional engagement between movable wall 75 and the relatively fixed brake band 90 (FIG. 19).

In accordance with another advantage of the improved damping arrangement, the outward camming movement of projection 94 to provide the frictional damping engagement with a portion of wall 75 will also cause a similar damping action diametrically opposite of projection 94. The outward movement of projection 94 will cause a diametrically opposite section of brake band 90 to move radially inwardly causing the inner surface of upstanding leg 92 to engage cylindrical wall 102 of end cap 63 as shown in FIGS. 13 and 17. This provides an equal and opposite damping or frictional engagement on the outer side of the movable tensioner housing achieving a balances damping effect on lever means 64.

Again, as in tensioner 1, since torsional spring 73 provides both the tensioning force for pivotally moving lever means 64 in a belt tensioning direction and the force for moving brake band 90 along the camming surface of the mounting end cap and into engagement with the lever means, this insures that the amount of damping is proportional to the belt tensioning force effecting a uniform damping throughout the tensioning range of the tensioning spring of modified tensioner 60. Also, the amount of damping provided by brake band 90 can be adjusted easily to correspond to the particular engine on which tensioner 60 is mounted by merely changing the angles of camming surfaces 96 and 100. This camming angle determines the frictional force component which act between band leg 92 and housing wall 75. This camming angle is approximately 5° with respect to a radial line although it could be modified as discussed above to provide a desired amount of frictional force. For example, increasing this camming angle to 10°, will decrease the frictional force component exerted against movable housing wall 75. Correspondingly, decreasing this angle will increase this frictional component. Brake band 90 is formed of a high strength plastic material similar to that of brake band 50 of tensioner 1.

Accordingly, belt tensioners 1 and 60 provide a device for tensioning an endless drive belt with a single torsional coil spring, which has an increased bearing life due to the alignment of the radial centerline of the belt receiving groove with that of the pivot bushing for the lever arm thereby reducing or eliminating the unbalanced frictional force component heretofore exerted between the pivot bushing and lever arm. Tensioners 1 and 60 provide a unique damping band arrangement which eliminates undesirable vibrations caused by the natural harmonics in a coil spring as well as those caused by the unbalanced forces exerted on the belt due to the sudden acceleration or deceleration of the vehicle engine, and particularly provides a tensioning device in which the brake band and friction force achieved thereby is proportional to the tension exerted on the idler pulley mounting arm since the coil spring supplies both the belt tensioning force as well as the camming force on the brake band. Furthermore, improved belt tensioners 1 and 60 are formed inexpensively of stamped sheet metal or cast aluminum components which are light weight and rugged, in which a usual inexpensive idler pulley is mounted on the outer end of the lever arm, and in which various belt tesnioning characteristics can be achieved by changing the characteristics of the torsional spring and by changing the camming angle between the damping brake band and fixed component of the mounting bracket.

Accordingly, the improved belt tensioner is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved belt tensioner is constructed and used, the characteristics of the construction, and the advantages, new and useful results obtained; the new and useful structures, devices, elements, arrangements, parts, and combinations, are set forth in the appended claims.

What is claimed is:

1. A belt tensioner construction for automatically tensioning an endless drive belt of a drive system for vehicle accessories, said tensioner construction including:
 (a) a bracket having a camming surface adapted to be mounted on a vehicle engine adjacent the drive belt;
 (b) a shaft mounted on the bracket;
 (c) lever means pivotally mounted on the shaft and extending generally radially outwardly from the shaft for pivotal movement toward and away from the drive belt;
 (d) pulley means rotatably mounted on an extended end of the lever means and engageable with the drive belt for applying a tensioning force on said belt when the lever is biased in a belt tensioning direction toward the drive belt;
 (e) a generally annular-shaped brake band ring located between the bracket and lever means and formed with a camming surface complementary to and engageable with the camming surface of the bracket; and
 (f) coil spring means telescopically mounted about the shaft and engageable with the lever means and brake band ring for biasing the lever means in the belt tensioning direction and for biasing the ring into engagement with the lever means by movement of the ring along the camming surface of the bracket by the engagement of the complementary camming surfaces of the bracket and brake band ring to retard movement of the lever means in a direction opposite to the belt tensioning direction.

2. The belt tensioner defined in claim 1, in which the mounting bracket camming surface is an angularly extending tab; and in which the brake band ring camming surface is a complementary angled surface of a recess formed in the band ring into which the tab extends.

3. The belt tensioner defined in claim 2, in which a pair of diametrically spaced tabs are formed on the mounting bracket and engage a pair of angled surfaces formed in a pair of recesses formed in the band ring.

4. The belt tensioner defined in claim 2, in which the brake band ring is formed of a plastic material.

5. The belt tensioner defined in claim 2, in which the damping force provided by the brake band ring is adjustable by changing the angles of the camming surfaces of the mounting bracket and brake band ring.

6. The belt tensioner defined in claim 1, in which the mounting bracket is a generally flat disc-shaped plate; in which the lever means includes a spring housing and an extended arm; in which the coil spring means includes a torsional coil spring mounted within the spring housing with one end of said spring being attached to the lever means and another end of said spring being engaged with the brake band ring.

7. The belt tensioner defined in claim 6, in which the spring housing has a generally annular-shaped flat bottom wall portion which is engaged by the brake band ring for retarding the movement of the lever means.

8. The belt tensioner defined in claim 6, in which the spring housing portion of the lever means includes a central hub telescopically mounted on the shaft for pivotally mounting the lever means on said shaft; and in which a washer is engaged between a top wall of the spring housing and a retainer plate portion of the shaft.

9. The belt tensioner defined in claim 1, in which the shaft includes a hollow tubular member secured on the mounting bracket; in which the lever means is provided with a cylindrical hub telescopically pivotally mounted on the tubular member; and in which the cylindrical hub has a bushing to provide a low friction engagement with the tubular member.

10. The belt tensioner defined in claim 1, in which the lever means includes housing formed with a central opening through which the shaft extends to pivotally mount the lever means on said shaft and a radially outwardly extending arm; in which the pulley means includes an idler pulley rotatably mounted on a stub shaft mounted on an end of the arm; in which the pulley is formed with a peripheral belt receiving groove; and in which a line extending radially through the center of the pulley groove extends through the center of the mounting shaft.

11. The belt tensioner defined in claim 10, in which the mounting shaft and pulley stub shaft are parallel to each other.

12. The belt tensioner defined in claim 1, in which the spring means includes a torsional coil spring which biases the lever means and brake band means in opposite rotational directions with respect to each other thereby providing a damping effect on the pulley means which is proportional to the torque of the coil spring means.

13. An improved damping construction for a belt tensioner of the type having a rotatable pulley which engages an endless drive belt of a drive system for vehicle accessories, in which the belt engaging pulley is mounted on a lever which is pivotally mounted on a bracket and in which the lever and pulley are moved in a belt tensioning direction by a torsional coil spring, wherein the improvement includes a brake band having an annular ring-shaped configuration with a sloped camming surface; and a sloped camming surface formed on the bracket generally complementary to and engaged with the camming surface of the brake band ring to direct the brake band into frictional engagement with the lever, with said brake band being biased by the torsional coil spring in a direction opposite to the belt tensioning direction of the lever and pulley and along the sloped camming surface of the bracket and into frictional engagement with the lever.

14. The improved damping construction defined in claim 13, in which the pulley has a peripheral belt receiving surface; and in which a line extending generally radially through the center of said belt receiving surface extends generally through the center of the pivotal mounting of the lever on the bracket.

15. The improved damping construction defined in claim 13, including shaft means for pivotally mounting the lever on the bracket; in which the coil spring and brake band ring are telescopically mounted about the shaft means; and in which the spring has two ends one of which is connected to the lever and the other connected to the brake band ring.

* * * * *